United States Patent

Kobayashi et al.

(10) Patent No.: US 6,844,634 B2
(45) Date of Patent: Jan. 18, 2005

(54) VEHICULAR ELECTRIC POWER GENERATION CONTROL APPARATUS

(75) Inventors: Kazuhira Kobayashi, Ebina (JP); Satoshi Yajima, Fujisawa (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/653,888

(22) Filed: Sep. 4, 2003

(65) Prior Publication Data

US 2004/0053083 A1 Mar. 18, 2004

(30) Foreign Application Priority Data

Sep. 18, 2002 (JP) .................................... P 2002-271318

(51) Int. Cl.[7] .............................. F02N 11/06; H02P 9/04
(52) U.S. Cl. ..................................................... 290/40 C
(58) Field of Search ........................... 290/40 C, 40 B, 290/40 R; 180/65.3; 429/9, 50; 307/98; 320/104

(56) References Cited

U.S. PATENT DOCUMENTS

| 4,757,249 | A | * | 7/1988 | Farber et al. ................ 320/126 |
| 5,545,928 | A | * | 8/1996 | Kotani ...................... 290/40 C |
| 5,929,608 | A | * | 7/1999 | Ibaraki et al. ................ 322/16 |
| 5,977,652 | A | * | 11/1999 | Frey et al. ................. 307/10.1 |
| 5,977,744 | A | * | 11/1999 | Williams et al. ............ 320/104 |
| 6,077,186 | A | * | 6/2000 | Kojima et al. ................. 477/3 |
| 6,294,843 | B1 | * | 9/2001 | Kato et al. ................ 290/40 C |
| 6,321,707 | B1 | * | 11/2001 | Dunn ....................... 123/179.3 |
| 6,323,608 | B1 | * | 11/2001 | Ozawa ....................... 318/139 |
| 6,345,216 | B1 | * | 2/2002 | Morimoto et al. ............. 701/22 |
| 6,504,259 | B1 | * | 1/2003 | Kuroda et al. ............ 290/40 C |
| 2004/0163860 | A1 | * | 8/2004 | Matsuzaki et al. ......... 180/65.2 |
| 2004/0164560 | A1 | * | 8/2004 | Odahara et al. .......... 290/40 C |

FOREIGN PATENT DOCUMENTS

| JP | P2002-25630 A | 1/2002 |
| JP | P2002-42900 A | 2/2002 |
| JP | P2002-51471 A | 2/2002 |

* cited by examiner

Primary Examiner—Joe Waks
Assistant Examiner—Julio R. Gonzalez
(74) Attorney, Agent, or Firm—McDermott Will & Emery LLP

(57) ABSTRACT

A lithium ion battery 11 is connected in parallel to a lead acid battery 9 charged with electric power generated by a generator 2. The lithium ion battery 11 has internal resistance smaller than internal resistance of the lead acid battery 9 and being charged with the electric power generated by the generator 2. An ECM 6 supplies an electric power generation command value based on a running state of a vehicle, and an ECU 7 controls the generator 2 for electric power generation by supplying the electric power generation command voltage to the generator 2.

6 Claims, 3 Drawing Sheets

VEHICULAR ELECTRIC POWER GENERATION CONTROL APPARATUS

BACKGROUND OF THE INVENTION

1. Field of the Invention

The present invention relates to a vehicular electric power generation control apparatus which charges/controls two batteries efficiently by controlling a generator driven by an engine.

2. Description of the Related Art

Japanese Patent Laid-Open Publication 2002-25630 shows an electric power source system for a running vehicle, in which an aqueous secondary battery composed of a lead battery and a non-aqueous secondary battery composed of a lithium (ion) battery are connected in parallel. This electric power source system is featured in that a ratio (X/Y) of a current value (X) flowing through the aqueous secondary battery and a current value (Y) flowing through the non-aqueous secondary battery is set within a range from 0.05 to 1.00 during charging at a current value at which a charging rate is 7C or less, and that the current flowing through the lithium battery is made larger than the current flowing through the lead battery.

Due to the features as described above, regenerated energy generated by a generator during braking of a vehicle is charged as regenerated electric power in the lithium battery having a larger generation capability than the lead battery though the regenerated energy is partially charged in the lead battery. Therefore, energy efficiency is enhanced as the electric power source system for the running vehicle. Consequently, an adverse effect to a battery life, which is caused by acceleration of a decomposition reaction of water, can be prevented. The decomposition reaction occurs due to a large current flowing during charging the lead battery.

SUMMARY OF THE INVENTION

However, the foregoing related art has only described that a lithium battery and a lead battery are connected in parallel and that a current flowing through the lithium battery is made larger than a current flowing through the lead battery during charging the battery. No description has been made regarding a specific control method such as how to control the generator for supplying/controlling the currents to the two batteries.

The present invention has been created in consideration of the above-described matter. It is an object of the present invention to provide a vehicular electric power control apparatus, in which a generator driven by an engine is controlled, and charge efficiency of two batteries different in charge capability is enhanced, the batteries being charged with electric power obtained by the generator.

In order to attain the object described above, the present invention provides a vehicular electric power generation control apparatus including, a generator driven by an engine and controlled for electric power generation based on an electric power generation command voltage, an aqueous secondary battery charged with electric power generated by the generator, a non-aqueous secondary battery connected in parallel to the aqueous secondary battery, having internal resistance smaller than internal resistance of the aqueous secondary battery, and charged with the electric power generated by the generator, a first voltage detecting unit for detecting a voltage of the aqueous secondary battery, a second voltage detecting unit for detecting a voltage of the non-aqueous secondary battery, a revolution number detecting unit for detecting a revolution number of the engine, a vehicle speed detecting unit for detecting a vehicle speed, an electric power generation command value computing unit for computing an electric power generation command value based on the revolution number of the engine and based on the vehicle speed detected by the vehicle speed detecting unit, the revolution number being detected by the revolution number detecting unit, and an electric power generation command voltage supplying unit for supplying, to the generator, an electric power generation command voltage based on the voltage of the aqueous secondary battery, the voltage of the aqueous secondary battery being detected by the first voltage detecting unit, based on the voltage of the non-aqueous secondary battery, the voltage of the non-aqueous secondary battery being detected by the second voltage detecting unit, and based on the electric power generation command value computed by the electric power generation command value computing unit.

According to the present invention, the generator is controlled for electric power generation by supplying, to the generator, the electric power generation command voltage based on the electric power generation command value calculated based on the revolution number of the engine and the vehicle speed, and based on the electric power generation command voltage based on the voltage of the non-aqueous secondary battery, internal resistance of which is smaller than that of the aqueous secondary battery. Therefore, the non-aqueous secondary battery is charged with electric power generated at the electric power generation command voltage, thus making it possible to enhance the charge efficiency during charging.

DETAILED DESCRIPTION OF THE PREFERRED EMBODIMENT

An embodiment of the present invention will be described below with reference to the drawings.

Figure 1:
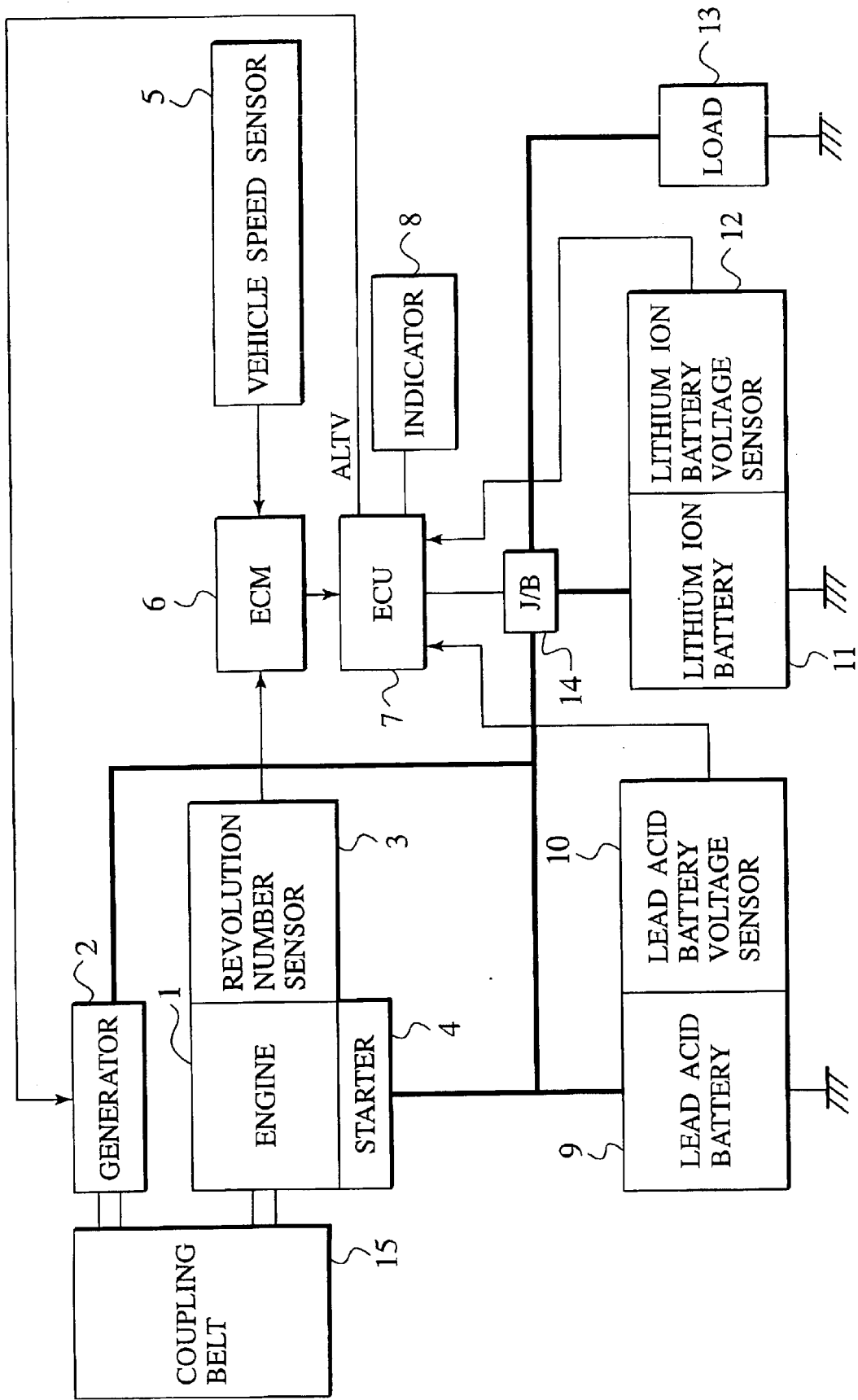
FIG. 1 is a diagram showing a configuration of a vehicular electric power system including a vehicular electric power generation control apparatus according to one embodiment of the present invention.

FIG. 1 is a diagram showing a configuration of a vehicular electric power system including a vehicular electric power generation control apparatus according to one embodiment of the present invention. In FIG. 1, the vehicular electric power system is provided with an engine 1, a generator 2 driven by the engine 1, a revolution number sensor 3 detecting a revolution number of the engine 1, a starter 4 starting the engine 1, a vehicle speed sensor 5 detecting a vehicle speed, an ECM (engine control module) 6 controlling the engine 1, an ECU (electric control unit) 7 controlling an electric power generation amount of the generator 2, an indicator 8, a lead acid battery 9 as an aqueous secondary battery, a lead acid battery voltage sensor 10 detecting a voltage of the lead acid battery 9, a lithium ion battery 11 as a non-aqueous secondary battery, a lithium ion battery voltage sensor 12 detecting a voltage of the lithium ion battery 11, a load 13 supplied with electric power from the lead acid battery 9 or the lithium ion battery 11, and a junction box (J/B) 14. Note that, in FIG. 1, bold lines denote power lines transmitting electric power therethrough, and thin lines denote control lines transmitting various signals therethrough.

The engine 1 is coupled to the generator 2 through a coupling belt 15. The generator 2 is driven by a driving force of the engine 1.

The generator 2 is driven by the engine 1 to generate electric power. For the electric power generation, the generator 2 is controlled based on an electric power generation command voltage supplied from the ECU 7. The generator 2 is connected to the lead acid battery 9. In addition, the generator 2 is connected to the lithium ion battery 11 and the load 13 through the junction box (J/B) 14. The electric power generated by the generator 2 is supplied to these two batteries 9 and 11 and the load 13.

The revolution number sensor 3 detects a revolution number of the engine 1, and supplies the detected revolution number to the ECU 7. The vehicle speed sensor 5 detects the vehicle speed, and supplies the detected vehicle speed to the ECM 6.

The ECM 6 computes an electric power generation command value based on the revolution number of the engine 1, which is detected by the revolution number sensor 3, and based on the vehicle speed detected by the vehicle speed sensor 5. For example, the ECM 6 has a table map in which the electric power generation command value corresponding to the revolution number of the engine 1 and the vehicle speed is preset. The ECM 6 computes an electric power generation command value TGTVB by use of the table map. The computed electric power generation command value is supplied to the ECU 7.

The ECU 7 computes an electric power generation command voltage ALTV based on the electric power generation command value supplied from the ECM 6, a battery voltage PBVB of the lead acid battery 9, which is supplied from the lead acid battery voltage sensor 10, and a battery voltage LIVB of the lithium ion battery 11, which is supplied from the lithium ion battery voltage sensor 12. Then, the ECU 7 supplies the obtained electric power generation command voltage ALTV to the generator 2, and controls the electric power generation of the generator 2. In addition, the ECU 7 detects a breakdown of the lithium ion battery 11 based on the battery voltage of the lithium ion battery 11, which is supplied from the lithium ion battery voltage sensor 12. When the breakdown of the lithium ion battery 11 is detected by the ECU 7, the ECU 7 allows the lithium ion battery 11 to be isolated from the main body of the apparatus by the junction box (J/B) 14.

When the breakdown of the lithium ion battery 11 is detected by the ECU 7, the indicator 8 notifies of the breakdown of the lithium ion battery 11 by being illuminated and blinking.

The lead acid battery 9 receives and is charged with the electric power generated by the generator 2. The stored electric power is supplied to the starter 4 and the load 13 through power lines.

The lithium ion battery 11 has internal resistance smaller than internal resistance of the lead acid battery 9. In addition, the lithium ion battery 11 has open-end voltage characteristics gradually lowered as the electric charge amount is changing. Since the lithium ion battery 11 has the characteristics described above, the generated electric power is applied and charged to the lithium ion battery 11, rather than to the lead acid battery 9, when the voltage of the electric power generated by the generator 2 is raised. On the other hand, when the voltage of the generated electric power is lowered, a discharge from the lithium ion battery 11 is started. Thus, the lithium ion battery 11 has higher charge efficiency than that of the lead acid battery 9.

The lithium ion battery 11 receives and is charged with the electric power generated by the generator 2, and the stored electric power is supplied to the starter 4 and the load 13 through the power lines. The lithium ion battery voltage sensor 12 detects the voltage of the lithium ion battery 11, and applies the detected voltage to the ECU 7.

The junction box (J/B) 14 connects/disconnects the lithium ion battery 11 to/from the load 13 under the control of the ECU 7. Specifically, supply of the electric power to the load 13 is controlled by the ECU 7 and the J/B 14, and when the breakdown of the lithium ion battery 11 is detected by the ECU 7, a relay and a semiconductor (not shown) in the J/B 14 are controlled, and the connection of the lithium ion battery 11 is interrupted. In FIG. 1, the junction box (J/B) 14 is illustrated as a separate body from the ECU 7, and however, may be unified with the ECU 7.

Figure 2:
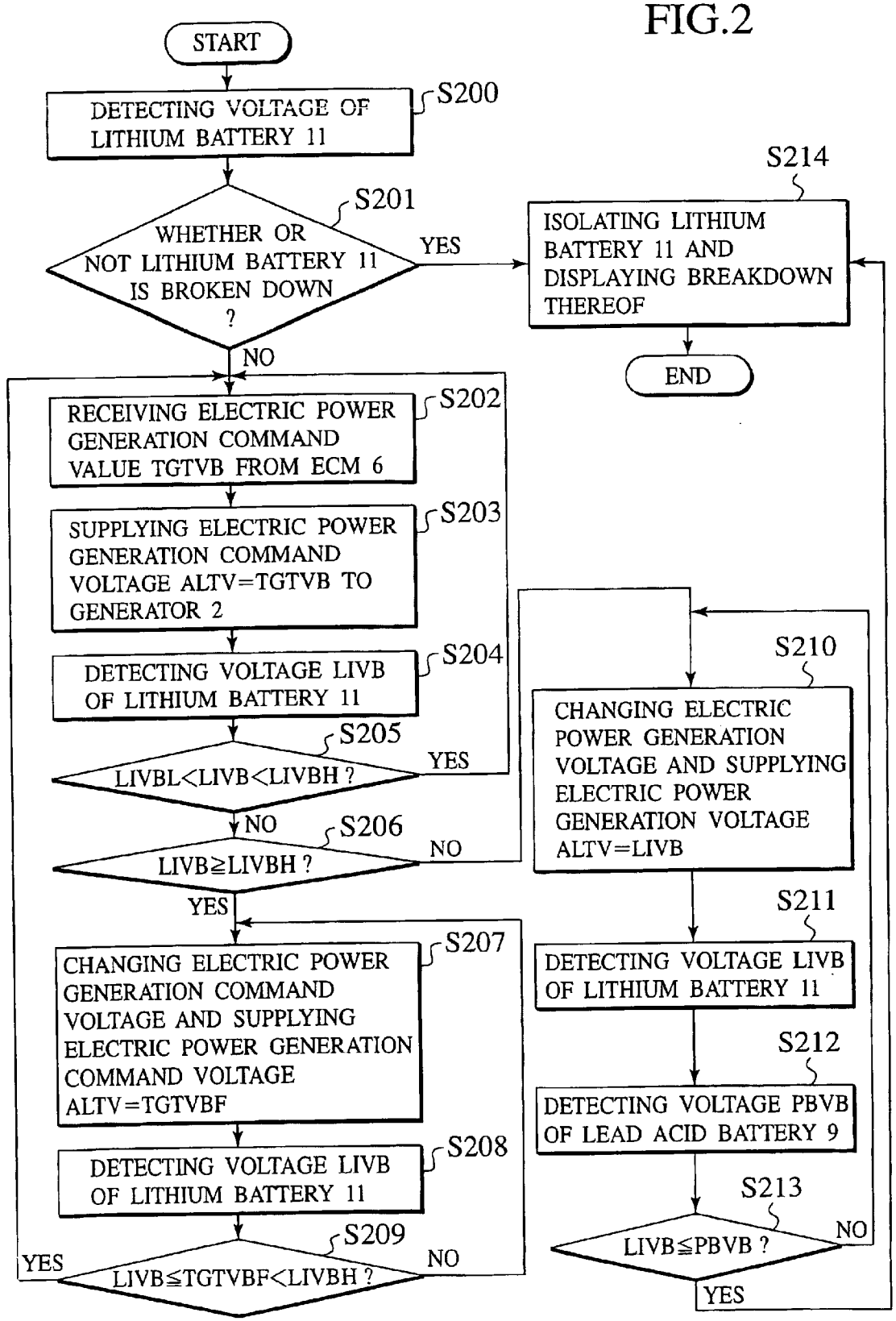
FIG. 2 is a flowchart showing a procedure of electric power generation control performed in an ECU 7.

FIG. 2 is a flowchart showing a procedure of electric power generation control performed in the ECU 7.

In FIG. 2, this procedure of the electric power generation control is started when an ignition switch is turned on and the engine 1 is started. First, in Step S200, the battery voltage LIVB of the lithium ion battery 11 is detected by the lithium ion battery voltage sensor 12.

Next, in Step S201, it is determined whether or not the detected battery voltage LIVB is within a predetermined range, and thus abnormal actions of the lithium ion battery 11 are diagnosed. When the detected battery voltage LIVB is not within the predetermined range, it is determined that the abnormal actions occur in the lithium ion battery 11, and the control proceeds to Step S214 to be described later. On the other hand, when the detected battery voltage LIVB is within the predetermined range, the control proceeds to Step S202.

Next, in Step S202, the electric power generation command value TGTVB computed in the ECM 6 is received. Subsequently, in Step S203, the received electric power generation command value TGTVB is supplied as the electric power generation command voltage ALTV (=TGTVB) to the generator 2.

Next, in Step S204, the battery voltage LIVB of the lithium ion battery 11 is detected by the lithium ion battery voltage sensor 12. Subsequently, in Step S205, it is determined whether or not the detected battery voltage LIVB is present within a specified range, that is, within a range between an upper limit value (LIVBH) and a lower limit value (LIVBL). This determination is performed for determining whether or not the lithium ion battery 11 requires a charge, that is, whether or not the lithium ion battery 11 can supply the electric power to the load 13. Hence, the range specified by the upper limit value and the lower limit value becomes identical to a range where the lithium ion battery 11 is determined to require the charge. Specifically, the upper and lower limit values are threshold values for determining whether or not the electric power can be supplied to the load 13.

When the detected battery voltage LIVB is present within the specified range of: LICVL<LIVB<LIVBH in the determination result, it is determined as a state that the lithium ion battery 11 requires the charge and cannot supply the electric power to the load 13. Then, the control returns to Step S202 in order to continue the electric power generation by the generator 2. On the other hand, when the detected battery voltage LIVB is not present within the specified range of: LICVL<LIVB<LIVBH, the control proceeds to Step S206.

Next, in Step S206, it is determined whether or not the detected battery voltage LIVB is equal to/more than the upper limit value of the specified range (LIVB≧LIVBH). When the battery voltage LIVB is equal to/more than the upper limit value described above in the determination result, it is determined as a state that the charged voltage of the lithium ion battery 11 is sufficient, and the electric power can be supplied from the lithium ion battery 11 to the load 13. Then, the control proceeds to Step S207. On the other hand, when the battery voltage LIVB is not equal to/more than the upper limit value described above, the control proceeds to Step S210 to be described later.

Next, in Step S207, the electric power generation command voltage ALTV supplied from the ECU 7 to the generator 2 is changed from a value of TGTVB, which has been outputted, to TGTVBF lower than this TGTVB. Then, the changed electric power generation command voltage ALTV=TGTVBF is supplied to the generator 2.

Next, in Step S208, the battery voltage LIVB of the lithium ion battery 11 is detected by the lithium ion battery voltage sensor 12. Subsequently, in Step S209, it is determined whether or not the changed electric power generation command voltage TGTVBF is present within a range between the detected battery voltage LIVB and an upper limit value LIBVH of the lithium ion battery 11 (LIVB≦TGTVBF<LIVBH). Specifically, it is determined whether or not a "YES" state (LIVB≧LIVBH) continues in the determination processing performed in Step S206. When the changed electric power generation command voltage TGTVBF is not present within the range of: LIVB≦TGTVBF<LIVBH in the determination result, that is, when the "YES" state (LIVB≧LIVBH) continues in the determination processing performed in Step S206, it is determined as a state that the charged amount of the lithium ion battery 11 is sufficient and the electric power can be supplied to the load 13. Specifically, the electric power generation by the generator 2 is determined to be unnecessary. Then, the control returns to Step S207, the electric power generation command voltage ALTV=TGTVBF, which commands no electric power generation, is supplied to the generator 2 continuously, and the generator 2 is set in a non-electric power generation state.

On the other hand, when the changed electric power generation command voltage TGTVBF is present within the range of: LIVB≦TGTVBF<LIVBH, that is, when a "NO" state appears in the determination processing performed in Step S206, it is determined that it is necessary to charge the lithium ion battery 11, and the control returns to Step S202.

Next, when the detected battery voltage LIVB in the processing in Step S206 is not equal to/more than the upper limit value of the specified range described above (LIVB≧LIVBH) as a result of the determination whether or not the battery voltage LIVB is equal to/more than the upper limit value, it is determined that the battery voltage LIVB is lowered more than the lower limit value (LIVBL) of the specified range, and the control proceeds to Step S210. In Step S210, the electric power generation command voltage ALTV supplied to the generator 2 is changed from the value of TGTVB, which has been outputted, to the detected battery voltage LIVB, and the changed electric power generation command voltage ALTV=LIVB is supplied to the generator 2.

Next, in Step S211, the battery voltage LIVB of the lithium ion battery 11 is detected by the lithium ion battery voltage sensor 12. Subsequently, in Step S212, the battery voltage PBVB of the lead acid battery 9 is detected by the lead acid battery voltage sensor 10.

Next, it is determined whether or not the detected battery voltage LIVB of the lithium ion battery 11 is equal to/less than the detected battery voltage PBVB of the lead acid battery 9 (LIBV≦PBVB). In the determination result, when the battery voltage LIVB of the lithium ion battery 11 is not equal to/less than the detected battery voltage PVBV of the lead acid battery 9 (LIBV≦PBVB), that is, when the battery voltage LIVB of the lithium ion battery 11 is more than the battery voltage PBVB of the lead acid battery 9, the control returns to Step S210.

On the other hand, when the battery voltage LIVB of the lithium ion battery 11 is equal to/less than the battery voltage PBVB of the lead acid battery 9, the control proceeds to Step S214.

Next, in Step S214, it is determined that an abnormal action such as a breakdown occurs in the lithium ion battery 11, and the abnormal action of the lithium ion battery 11 is notified by, for example, illuminating the indicator 8. Moreover, the lithium ion battery 11 is isolated from the load 13 and the generator 2 by the junction box 14, and the connection of the power source circuit of the lithium ion battery 11 is interrupted.

Figure 3:
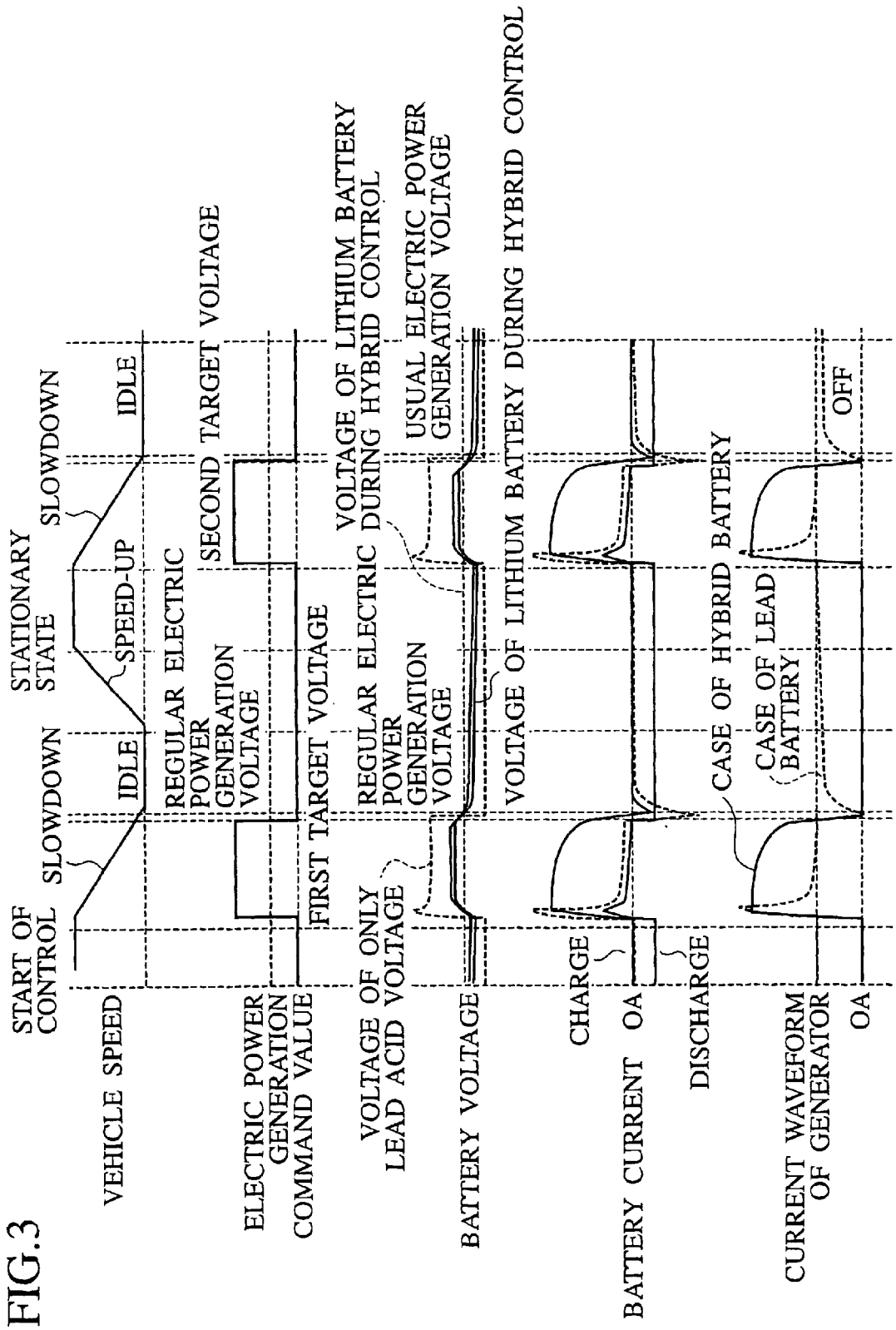
FIG. 3 is a diagram showing states of charged/discharged currents of a lead acid battery and a lithium ion battery, and an operational current of a generator.

FIG. 3 is a diagram showing states of the charged/discharged currents of the lead acid battery 9 and the lithium ion battery 11 and showing the operational current of the generator 2 in the case of implementing the electric power generation control in the ECU 7. In FIG. 3, in comparison with the case of employing only the lead acid battery 9, in the case of employing a hybrid battery formed by adding the lithium ion battery 11 to the lead acid battery 9, recovery efficiency of electric power generation energy at the time when a vehicle slows down is enhanced. In addition, it is understood that a non-electric power generation time of the generator 2 is extended by enhancing the recovery efficiency of the electric power generation energy. Consequently, the load torque of the generator 2, which is applied to the engine 1, is lowered, thus making it possible to contribute to the enhancement of fuel consumption.

As described above, in the above-described embodiment, the generator 2 is controlled for the electric power generation based on a running state of the vehicle, such as the revolution number of the engine 1 and the vehicle speed, and based on the voltages of the lead acid battery 9 and the lithium ion battery 11. Thus, the lithium ion battery 11 having the internal resistance smaller than that of the lead acid battery 9 is charged/discharged. Therefore, the charge efficiency of the whole system can be enhanced.

Moreover, when the voltage of the lithium ion battery 11 reaches the predetermined value or above, the generator 2 is adapted to be set in the non-electric power generation state. Thus, the load to the engine driving the generator 2 is lowered, thus making it possible to enhance the fuel consumption.

Furthermore, when the lithium ion battery 11 is broken down, the lithium ion battery 11 is adapted to be isolated from a power source circuit and the connection thereof is adapted to be interrupted. Therefore, a continuous use of the broken-down lithium ion battery 11 can be avoided.

In addition, the breakdown of the lithium ion battery 11 is adapted to be notified. Therefore, the repair of the lithium ion battery 11 can be prompted.

Note that correspondence relationships between the constituent components of the embodiment and constituent components of the scope of claims are as follows. Specifically, the generator 2 corresponds a generator; the lead acid battery 9 corresponds an aqueous secondary battery; the lithium ion battery 11 corresponds a non-aqueous secondary battery; the lead acid battery voltage sensor 10 corresponds a first voltage detecting unit; the lithium ion battery sensor 12 corresponds a second voltage detecting unit; the revolution number sensor 3 corresponds a revolution number detecting unit; the vehicle speed sensor 5 corresponds a vehicle speed detecting unit; the ECM 6 corresponds an electric power generation command value computing unit; and the ECU 7 corresponds an electric power generation command voltage supplying unit.

In addition, the load 13 corresponds a load; the ECU 7 corresponds a breakdown detecting unit; the junction box 14 corresponds a connection controlling unit; and the indicator 8 corresponds a notifying unit.

Japanese Patent Application No. 2002-271318, filed on Sep. 18, 2002, is incorporated herein by reference in its entirety.

What is claimed is:

1. A vehicular electric power generation control apparatus, comprising:
   a generator driven by an engine and controlled for electric power generation based on an electric power generation command voltage;
   an aqueous secondary battery charged with electric power generated by the generator;
   a non-aqueous secondary battery connected in parallel to the aqueous secondary battery, the non-aqueous secondary battery having internal resistance smaller than internal resistance of the aqueous secondary battery and being charged with the electric power generated by the generator;
   a first voltage detecting unit for detecting a voltage of the aqueous secondary battery;
   a second voltage detecting unit for detecting a voltage of the non-aqueous secondary battery;
   a revolution number detecting unit for detecting a revolution number of the engine;
   a vehicle speed detecting unit for detecting a vehicle speed;
   an electric power generation command value computing unit for computing an electric power generation command value based on the revolution number of the engine and based on the vehicle speed detected by the vehicle speed detecting unit, the revolution number being detected by the revolution number detecting unit; and
   an electric power generation command voltage supplying unit for supplying, to the generator, an electric power generation command voltage based on the voltage of the aqueous secondary battery, the voltage of the aqueous secondary battery being detected by the first voltage detecting unit, based on the voltage of the non-aqueous secondary battery, the voltage of the non-aqueous secondary battery being detected by the second voltage detecting unit, and based on the electric power generation command value computed by the electric power generation command value computing unit.

2. The vehicular electric power generation control apparatus according to claim 1,
   wherein the electric power generation command voltage is an electric power generation command voltage for setting the generator in an electric power generation state when the voltage of the non-aqueous secondary battery, the voltage being detected by the second voltage detecting unit, is equal to/less than a first threshold value, and is an electric power generation command voltage for setting the generator in a non-electric power generation state when the voltage of the non-aqueous secondary battery becomes equal to/more than a second threshold value larger than the first threshold value.

3. The vehicular electric power generation control apparatus according to claim 1, further comprising:
   a load driven by being supplied with electric power from at least one of the generator, the aqueous secondary battery and the non-aqueous secondary battery;
   a breakdown detecting unit for detecting a breakdown of the non-aqueous secondary battery based on the voltage of the non-aqueous secondary battery, the voltage being detected by the second voltage detecting unit; and
   a connection control unit for isolating the non-aqueous secondary battery from the load and the generator when the breakdown of the non-aqueous secondary battery is detected by the breakdown detecting unit.

4. The vehicular electric power generation control apparatus according to claim 3, further comprising a notifying unit for notifying of the breakdown of the non-aqueous secondary battery,
   wherein the breakdown of the non-aqueous secondary battery is notified by the notifying unit when the breakdown of the non-aqueous secondary battery is detected by the breakdown detecting unit.

5. A vehicular electric power generation control apparatus, comprising:
   a generator driven by an engine and controlled for electric power generation based on an electric power generation command voltage;
   an aqueous secondary battery charged with electric power generated by the generator;
   a non-aqueous secondary battery connected in parallel to the aqueous secondary battery, the non-aqueous secondary battery having internal resistance smaller than internal resistance of the aqueous secondary battery and being charged with the electric power generated by the generator;
   first voltage detecting means for detecting a voltage of the aqueous secondary battery;
   second voltage detecting means for detecting a voltage of the non-aqueous secondary battery;
   revolution number detecting means for detecting a revolution number of the engine;
   vehicle speed detecting means for detecting a vehicle speed;
   electric power generation command value computing means for computing an electric power generation command value based on the revolution number of the engine and based on the vehicle speed detected by the vehicle speed detecting means, the revolution number being detected by the revolution number detecting means; and electric power generation command voltage supplying means for supplying, to the generator, an electric power generation command voltage based on the voltage of the aqueous secondary battery, the voltage of the aqueous secondary battery being detected by the first voltage detecting means, based on the voltage of the non-aqueous secondary battery, the voltage of the non-aqueous secondary battery being detected by the second voltage detecting means, and based on the electric power generation command value computed by the electric power generation command value computing means.

6. A vehicular electric power generation control method, comprising:

preparing a generator driven by an engine and controlled for electric power generation based on an electric power generation command voltage, an aqueous secondary battery charged with electric power generated by the generator, and a non-aqueous secondary battery connected in parallel to the aqueous secondary battery, the non-aqueous secondary battery having internal resistance smaller than internal resistance of the aqueous secondary battery and being charged with the electric power generated by the generator;

detecting a voltage of the aqueous secondary battery;

detecting a voltage of the non-aqueous secondary battery;

detecting a revolution number of the engine;

detecting a vehicle speed;

computing an electric power generation command value based on the revolution number of the engine and based on the vehicle speed; and supplying to the generator an electric power generation command voltage based on the voltage of the aqueous secondary battery, the voltage of the non-aqueous secondary battery, and the electric power generation command value.

* * * * *